(12) United States Patent
Nilsson et al.

(10) Patent No.: US 6,536,511 B1
(45) Date of Patent: Mar. 25, 2003

(54) DEVICE FOR TREATING A GAS

(75) Inventors: Magnus Nilsson, Dalby (SE); Klas Bertilsson, Eslöv (SE)

(73) Assignee: Alfa Laval AB, Tumba (SE)

( * ) Notice: Subject to any disclaimer, the term of this patent is extended or adjusted under 35 U.S.C. 154(b) by 0 days.

(21) Appl. No.: 09/958,735

(22) PCT Filed: May 18, 2000

(86) PCT No.: PCT/SE00/01001

§ 371 (c)(1),
(2), (4) Date: Oct. 15, 2001

(87) PCT Pub. No.: WO00/71223

PCT Pub. Date: Nov. 30, 2000

(30) Foreign Application Priority Data

May 20, 1999 (SE) ............................................... 9901842

(51) Int. Cl.[7] .................................................. F28B 1/00
(52) U.S. Cl. ............................. 165/113; 165/167; 62/93
(58) Field of Search ............................... 165/112, 113, 165/166, 167; 62/93

(56) References Cited

U.S. PATENT DOCUMENTS

| 3,750,415 A | 8/1973 | Peuchen et al. |
| 3,818,718 A | 6/1974 | Freese |
| 4,193,443 A * | 3/1980 | Nanaumi et al. ........... 165/110 |
| 4,484,451 A | 11/1984 | Darm |
| 5,228,504 A | 7/1993 | Mantegazza et al. |
| 5,245,843 A * | 9/1993 | Shimoya et al. ............... 62/513 |
| 5,275,233 A * | 1/1994 | Little .......................... 165/111 |
| 5,562,157 A * | 10/1996 | Hasegawa et al. .......... 165/144 |
| 5,678,422 A * | 10/1997 | Yoshii et al. ................ 165/153 |
| 5,727,623 A | 3/1998 | Yoshioka et al. |

* cited by examiner

Primary Examiner—Allen Flanigan
(74) Attorney, Agent, or Firm—Fish & Richardson P.C.

(57) ABSTRACT

A device for treating a substantially gaseous medium includes a number of parallel plates (14) which are connected to each other and provided adjacent to each other in such a manner that they, via port holes in the plates (14), form a first channel (5) and a second channel (9, 9'). The first channel (5) is arranged to transport the gaseous medium, and the second channel (9, 9'), which is separated from but in heat transferring contact with the first channel (5), is arranged to transport a cooling medium for cooling the gaseous medium. At least a part (3) of the first channel (5) is arranged to separate liquid from the gaseous medium. The part (3) of the first channel (5) is formed by a plurality of plate interspaces between a part of the plates (14), wherein at least one of the plates (14), delimiting one of the plate interspaces, is arranged to be passed by the gaseous medium on both sides thereof.

17 Claims, 5 Drawing Sheets

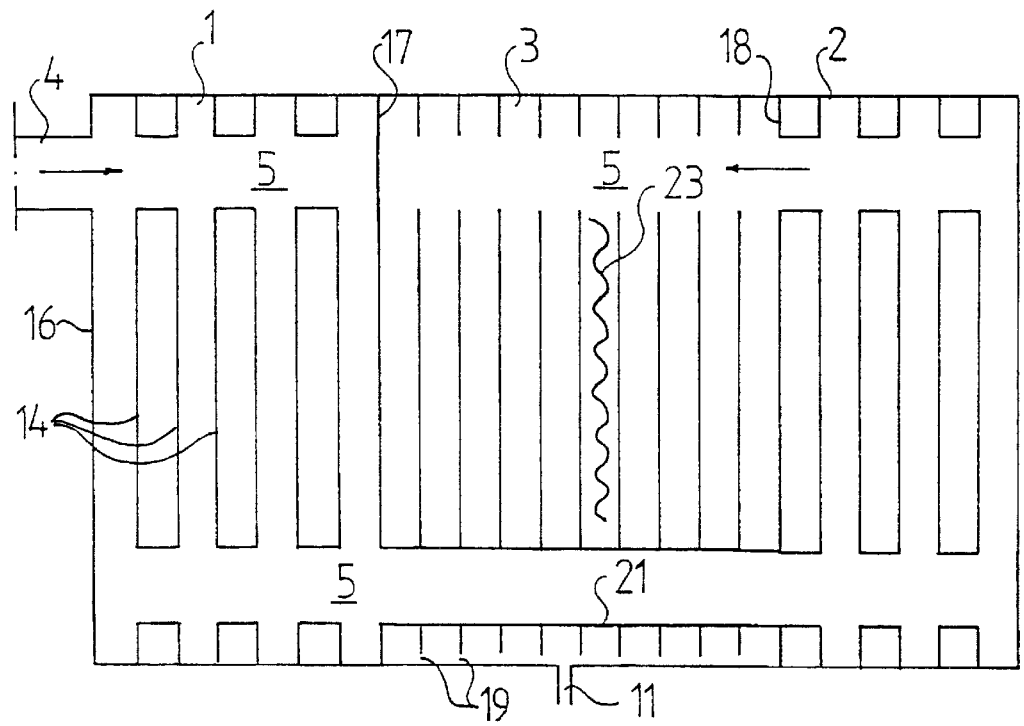
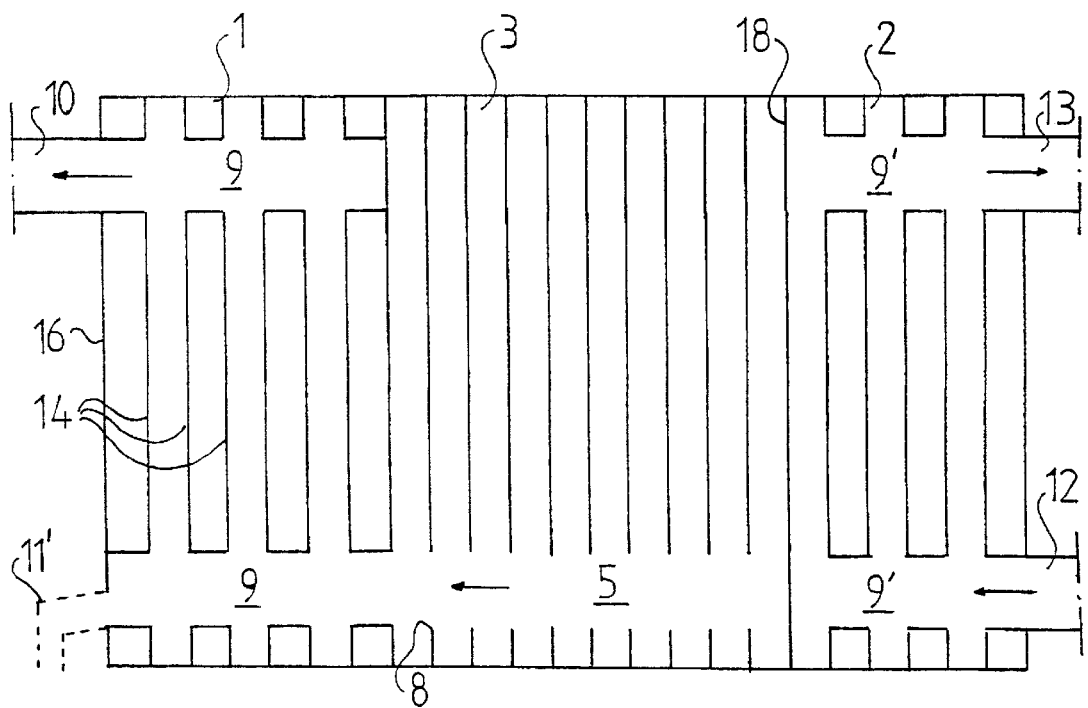

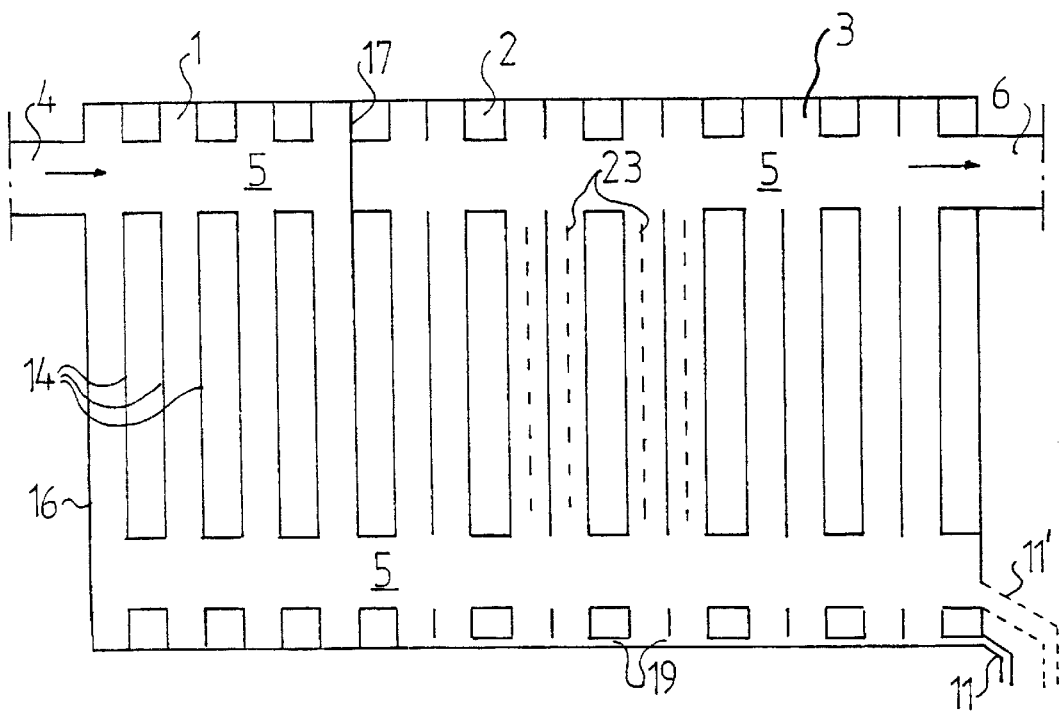
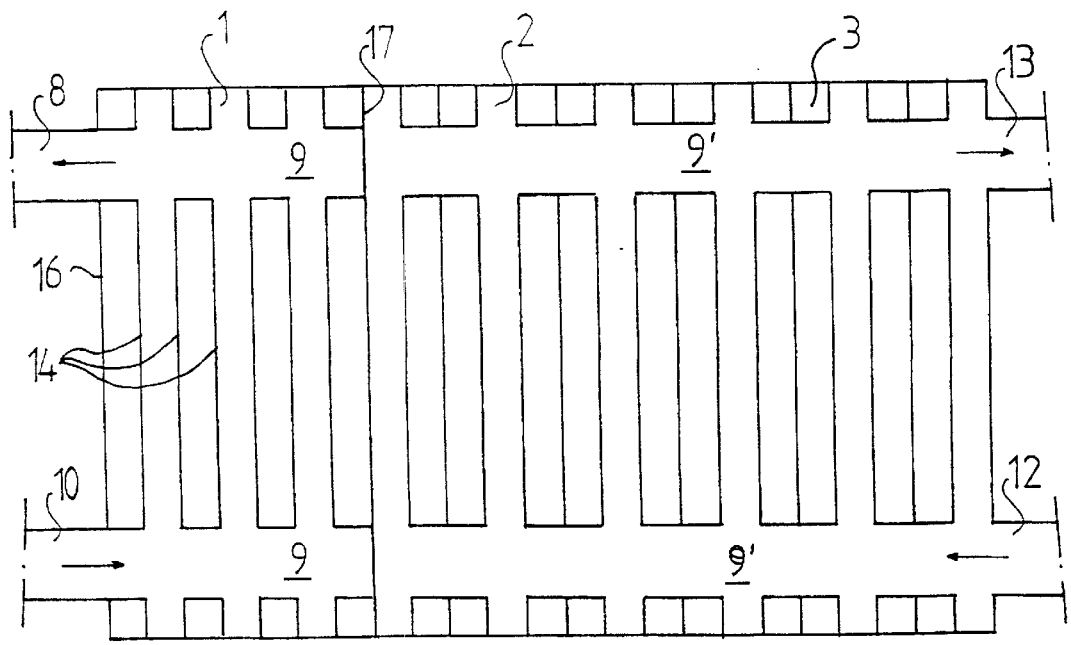

DEVICE FOR TREATING A GAS

THE BACKGROUND OF THE INVENTION AND PRIOR ART

The present invention refers to a device for treating a substantially gaseous medium, including a number of parallel plates which are connected to each other and provided adjacent to each other in such a manner that they by means of port holes of the plates form a first channel, which is arranged to transport the gaseous medium, and at least a second channel, which is separated from but in heat transferring contact with the first channel and which is arranged to transport a cooling medium for cooling the gaseous medium, wherein at least a part of the first channel forms a separation part and is arranged to separate liquid from the gaseous medium.

Such devices are used for dehumidifying of pressurised air from compressors before the pressurised air is supplied to pneumatic tools or machines, wherein the supplied pressurised air is first cooled by means of the heat exchanger part and thereafter moisture of the pressurised air is permitted to condense, whereafter the pressurised air and the condensate are separated in the separation part. It is known to design the heat exchanger part and the separation part as separate units, which has the disadvantage that a significant number of components and connection conduits are required. However, it has proved to be difficult to provide, at acceptable costs, a single unit for the heat exchanger part as well as the separation part due to the high pressures to be born by such a unit. In normal cases the parts are to bear a pressure of 8 bars, but there are also pneumatic systems operating at 13 bars and even higher pressures.

U.S. Pat. No. 5,727,623 discloses a device for drying pressurised air for pneumatic systems. The known device includes a heat exchanger part, having a number of parallel plates which are provided adjacent to each other in such a manner that they form a first channel and a second channel, which is separated from but in heat transferring contact with the first channel, and a separation part. The air to be dried is transported through the first channel of the heat exchanger part for cooling of the air and thereafter through the separation part for separating liquid from the air. The separation part is formed by a centrally provided chamber in which the pressurised air is permitted to condense. Although it is defined in this document that the separation part may include baffles to facilitate the condensing of the moisture present in the air, the supporting parts of the separation part appear to be formed by the circular cylindrical casing defining the chamber.

SUMMARY OF THE INVENTION

The object of the present invention is to provide an improved device for treating a gaseous medium, in particular for drying pressurised air.

This object is obtained by the device initially defined, which is characterised in that said separation part of the first channel is formed by a plurality of plate interspaces between one part of said plates, wherein at least one of the plates, delimiting one of said plate interspaces, is arranged to be passed by the gaseous medium on both sides thereof.

Thanks to the fact that the device is made of several parallel, adjacent plates, which are connected to each other, a very high strength of the device is obtained in an easy manner, which device thus may resist high inner pressures. By one or a plurality of plates, which on both sides are passed by the gaseous medium, large surfaces of the first channel are created, which in an efficient manner may increase the absorption of liquid, and in addition a relatively large total cross sectional area of the part of the first channel, which is intended to absorb liquid from the gaseous medium, is obtained. In such a manner, the flow velocity through this part of the first channel may be kept on a low level, which enables a high degree of separation. Furthermore, several distinct changes of direction for the gaseous medium are obtained by the plate arrangement of the separation part. Such changes of direction, which are substantially 90°, contribute to a more efficient separation of liquid than the one which may be obtained by a separation chamber of the type disclosed in U.S. Pat. No. 5,727,623.

According to an embodiment of the invention, the plates form a common plate package. In such a way it is possible to provide a very compact and pressure resistant unit of plates of the type which normally are used in plate heat exchangers. The plates are advantageously connected to each other by brazing. The different parts may be given the desired functions by pressing the area around the port holes of the plates in a suitable manner. Thereby, the plates, at least seen in a section extending substantially in parallel with the plates, may have substantially equal external dimensions.

According to a further embodiment of the invention, said separation part includes an outlet member for the discharge of the separated liquid. Advantageously, the plates are provided in such a manner that they extend substantially in parallel with a vertical plane, wherein the outlet member is provided in a lower part of said separation part. In such a way, the moisture which condenses will simply flow out of the separation part.

According to a further embodiment of the invention, the second channel includes a first channel portion, which is arranged to form a precooler for transporting a first cooling medium, and a second channel portion, which is arranged to form an evaporator for transporting a second cooling medium. In such a way, an efficient heat exchange is obtained, wherein the incoming gaseous medium is first precooled to a suitable temperature before it in the evaporator is subjected to a strong cooling by means of the second cooling medium which may re-circulate through said second channel portion. Advantageously, the evaporator is provided between the precooler and said separation part. In such a way, the gaseous medium will flow through the device from its one end to its second end and thereby successively pass through the port holes of successively located plates. Thereby, channels closed from said separation part may advantageously extend through said separation part and be arranged to enable the transportation of the second cooling medium to and from the evaporator. Alternatively, said separation part may be provided between the precooler and the evaporator. In such a way, the supply of the second cooling medium to the evaporator is facilitated.

According to a further embodiment of the invention, the first channel extends to an outlet of said separation part and is connected via an external or internal conduit to the second channel of the precooler, wherein the conduit is arranged to convey the gaseous medium from said outlet to the second channel of the precooler for heat exchange with the incoming gaseous medium. In such a way, the precooling of the gaseous medium mentioned above may be obtained in an easy and efficient manner. At the same time a heating of the gaseous medium is obtained by such a transportation of the gaseous medium before this leaves the device. Such a heating is desired in many pneumatic systems.

According to a further embodiment of the invention, at least a part of the second channel is formed by two of said plates, which are positioned adjacent to each other in such a manner that said part of the second channel extends therebetween, wherein said separation part of the first channel extends on both sides of said part of the second channel. Thereby, said part of the second channel may be included by the second channel portion. Furthermore, the plates, included by said separation part, may be arranged in such a way that each third interspace, which is formed between adjacent plates, forms a part of the second channel whereas the remaining interspaces, which are formed between adjacent plates, form a part of the first channel. Advantageously, at least one of said plate interspaces forming said separation part may include surface enlarging means.

BRIEF DESCRIPTION OF THE DRAWINGS

The present invention is now to be explained by means of an embodiment, which is described as an example, and with reference to the drawings attached.

FIG. 5 discloses schematically a section corresponding to the one in FIG. 3 of a second embodiment of the invention.

FIG. 6 discloses schematically a section corresponding to the one in FIG. 4 of the second embodiment.

FIG. 7 discloses schematically a section corresponding to the one in FIG. 3 of a third embodiment of the invention.

FIG. 8 discloses schematically a section corresponding to the one in FIG. 4 of the third embodiment.

DETAILED DESCRIPTION OF DIFFERENT EMBODIMENTS OF THE INVENTION

Figure 1:
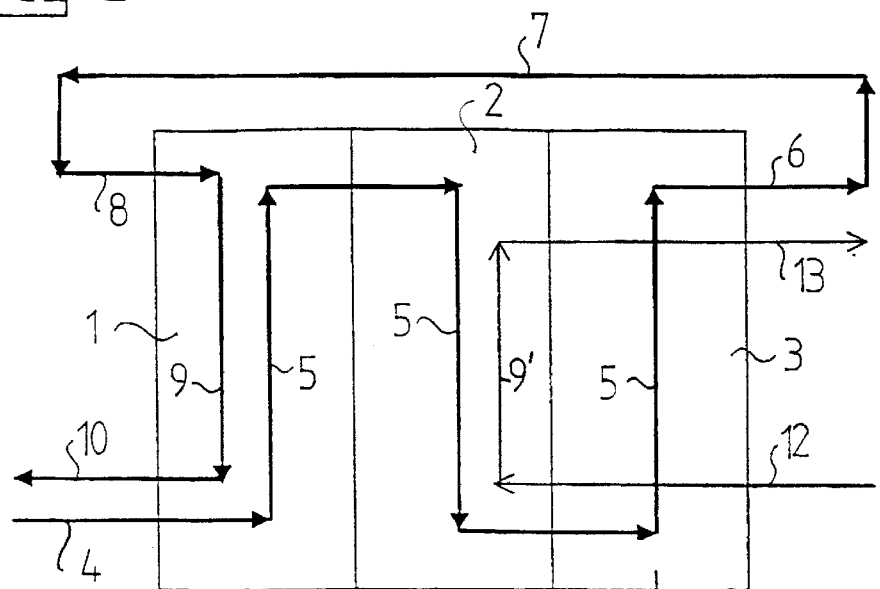
FIG. 1 discloses schematically, in a side view, the construction of a device according to a first embodiment of the invention.

FIGS. 1–4 disclose a device for treating a substantially gaseous medium. The device includes a precooler 1, an evaporator 2 and a separation part 3. The precooler 1 and the evaporator 2 form together a heat exchanger part.

In the following, the device will be described in connection with drying of pressurised air. It is to be noted, however, that the device also may be employed for treating other gaseous media from which a liquid is to be separated by condensation.

The air to be treated is conveyed in through an inlet 4 of the precooler 1 and via a first channel 5 through the precooler 1, the evaporator 2 and the separation part 3. The separation part 3 includes an outlet 6 for the air, which is conveyed out through the outlet 6 and via a conduit 7 to a second inlet 8 of the precooler 1. Thereafter, the air is transported through a second channel 9 of the precooler 1, for heat exchange with the air entering the device, and out through a second outlet 10 from which the pressurised air may be supplied to for instance a pneumatic tool. In such a way, the incoming air will be cooled in the precooler 1 at the same time as the air leaving the device is heated. The condensed moisture absorbed in the separation part 3 is collected in a lower part thereof and transported out of the device through an outlet member 11. It is to be noted that the different channels and conduits in FIG. 1 merely are illustrated as arrows.

The evaporator 2 also includes a second channel 9', which is separated from but in heat exchanging contact with the first channel 5 of the evaporator 2. The second channel 9' is arranged to enable the transportation of a cooling medium through the evaporator 2 for cooling of the air. The cooling medium has such properties that it during transportation through the evaporator 2 is evaporated. The cooling medium is supplied to the second channel 9' of the evaporator 2 through an inlet channel 12, closed from the separation part 3, and is removed from the second channel 9' of the evaporator 2 through an outlet channel 13 closed from the separation part 3. As appears from FIG. 1, the inlet channel 12 and the outlet channel 13 both extend through the separation part 3.

Figure 2:
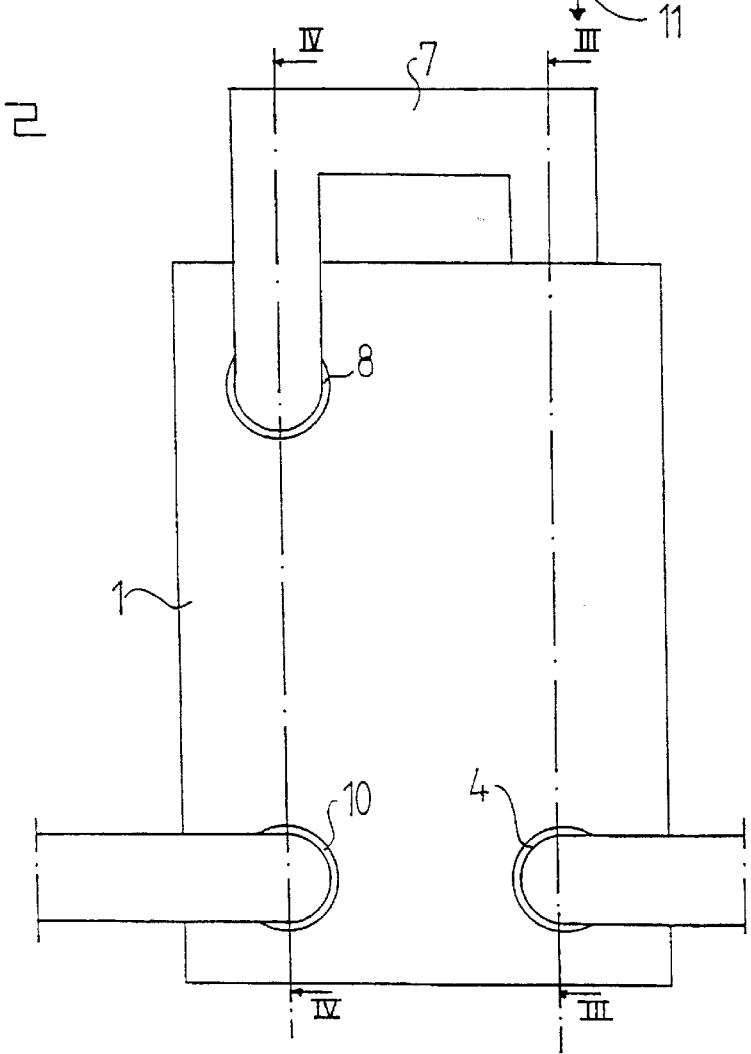
FIG. 2 discloses schematically another side view of the device according to the first embodiment.
Figure 3:
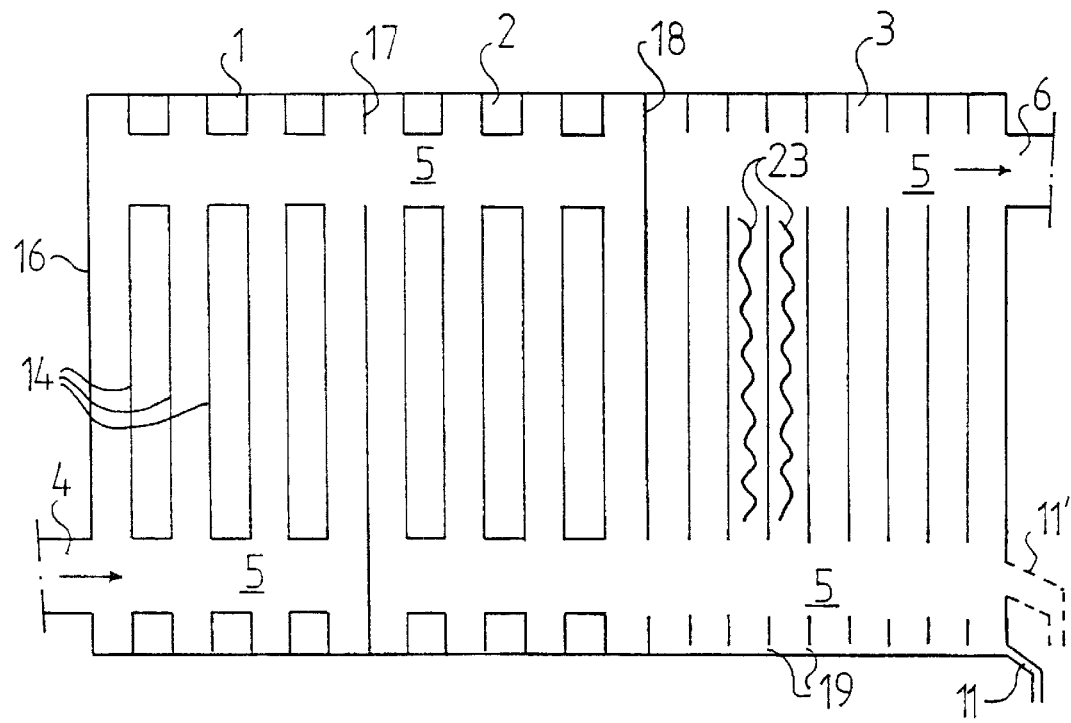
FIG. 3 discloses schematically a section along the line III—III in FIG. 2.
Figure 4:
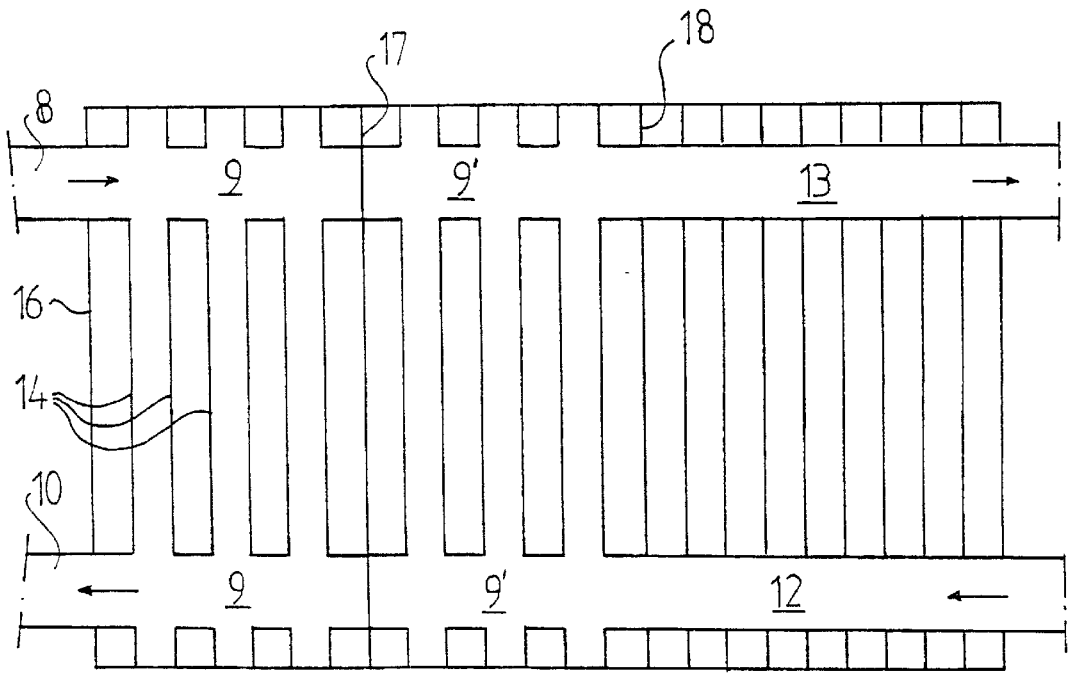
FIG. 4 discloses schematically a section along the line IV—IV in FIG. 2.

One example of the construction of the device according to the first embodiment of the invention is illustrated more closely in FIGS. 2–4. As appears, the device is made of substantially parallel plates 14 which are connected to each other by brazing in such a manner that a plate interspace is formed between adjacent plates 14. The plates 14 of the precooler 1, the evaporator 2 and the separation part 3 have substantially equal external dimensions and are connected to each other in such a way that they form one single common plate package. The device achieves in this way a very compact shape. The plates 14 are provided with port holes which form port hole channels through the plate package. Thereby, all plates 14, which do not form border line plates with regard to the surroundings or any one of the other parts 1, 2, 3, have four port holes. In FIGS. 3 and 4, a relatively small number of plates are disclosed. The selected number is merely intended to illustrate the function of the device and it is to be noted that the device may be realised by a substantially larger number of plates 14.

The plate 16 of the precooler 1, which faces the surroundings, is provided with three port holes. The plates 14 located inside the plate 16 are connected to each other and provided adjacent each other in such a way that they by means of the four port holes of each plate 14 form the first channel 5 and the second channel 9, which is separated from but in heat transferring contact with the first channel 5. The end plate 17 of the precooler 1, which also forms the end plate of the evaporator 2, is provided with one port hole, see FIG. 3. At this port hole, the air may pass in the first channel 5 from the precooler 1 to the evaporator 2. The plates 14 of the evaporator 2, which are located inside the end plate 17, have four port holes and are connected to each other in such a way that they form the first channel 5 and the second channel 9' for the second cooling medium. The second end plate 18 of the evaporator 2, which adjoins and also forms an end plate of the separation part 3, is provided with three port holes. Consequently, the end plate 18 is designed in such a way that the air may pass through this plate 17 in the first channel 5 to the separation part 3 and in such a way that the cooling medium may pass from the inlet channel 12 to the second channel 9' of the evaporator 2 and out through the outlet channel 13. The intermediate plates 14 of the separation part 3 are all provided with four port holes and connected to each other in such a way that an interspace is formed between adjacent plates 14 and that all these interspaces form the first channel 5, i.e. the air, which is transported through the separation part 3, passes all plates 14 in a substantially parallel flow from a lower part of the separation part 3 to an upper part of the separation part 3, see FIG. 3. Furthermore, as appears from FIG. 4, the plates 14 of the separation part 3 are shaped and connected to each other in such a way that the inlet channel 12 and the outlet channel 13 are completely closed to the first channel 5.

Furthermore, the plates 14 of the separation part 3 include an aperture 19 forming a conduit to the above mentioned outlet member 11 for the condensate formed in the separation part 3. The outlet member 11 may be designed in many different ways and in its most simple form merely be comprised by a hole extending into the plate package in the separation part 3. Furthermore, the outlet member 11' may be formed by one of the four port holes of the plates 14, see FIG. 3.

The second embodiment of the invention, disclosed in FIGS. 5 and 6, differs from the first embodiment by the fact that the separation part 3 is provided between the precooler 1 and the evaporator 2. In such way, the supply of the cooling medium to the evaporator 2 through the second channel 9' is facilitated. The first channel extends substantially straight through the separation part 3 by means of a pipe conduit 21, which is closed to the separation part 3 and arranged to convey the air from the precooler 1 through the separation part 3 to the evaporator 2.

FIGS. 7 and 8 disclose a third embodiment of the invention with a precooler 1 and an evaporator 2, which is integrated in the separation part 3 in such a way that each third interspace, which is formed between adjacent plates 14, forms a part of the second channel 9' for the transportation of the cooling medium of the evaporator 2 whereas the remaining interspaces between adjacent plates 14 forms a part of the first channel 5 for the air to be dried. Thereby, each third plate 14 in the combined evaporator and separation part 2, 3 will be located in the first channel 5 and be passed on both sides of the air to be dried. Consequently, the first channel 5 in the combined evaporator and separation part 2, 3 will have a larger flow cross section than in the precooler 1. Thereby, a reduction of the flow velocity and an improved separation of moisture from the air is enabled. Furthermore, the plate 14 which on both side is passed by air will offer a large surface on which moisture may be deposited. Also in this third embodiment, the air will be conveyed out through the outlet 6 and via a conduit, compare reference sign 7 in FIG. 1, be conveyed into the inlet 8 of the precooler 1 and through the second channel 9 to the outlet 10.

Figure 9:
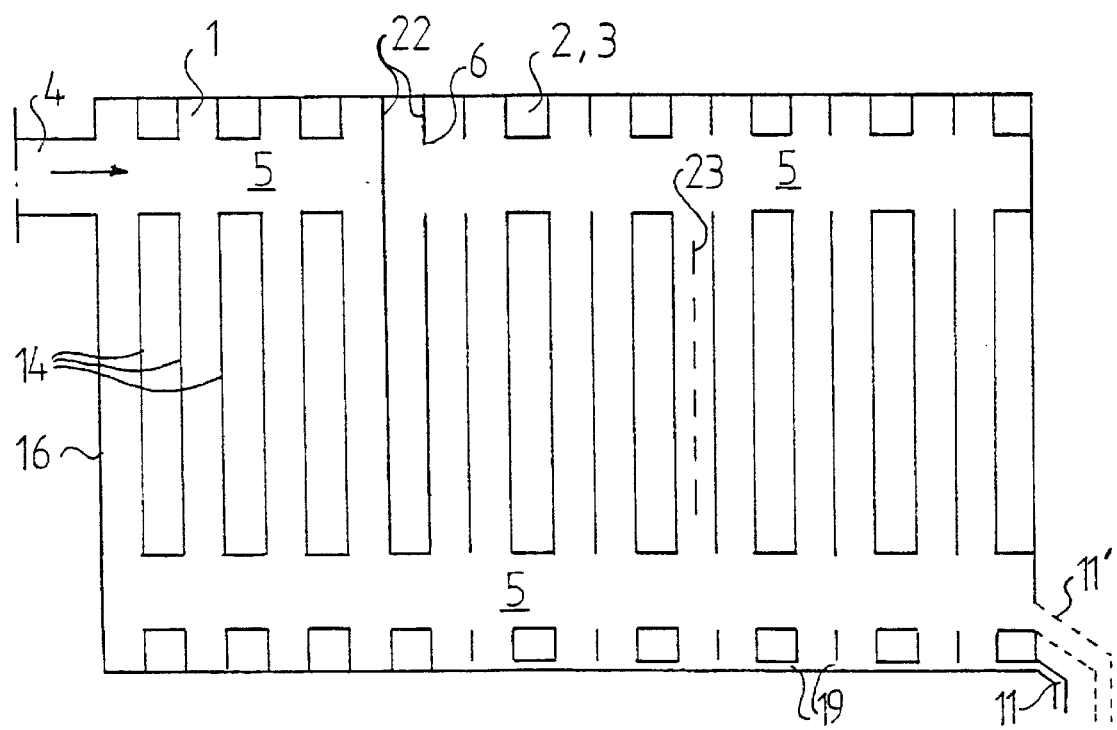
FIG. 9 discloses schematically a section corresponding to the one in FIG. 3 of a forth embodiment of the invention.
Figure 10:
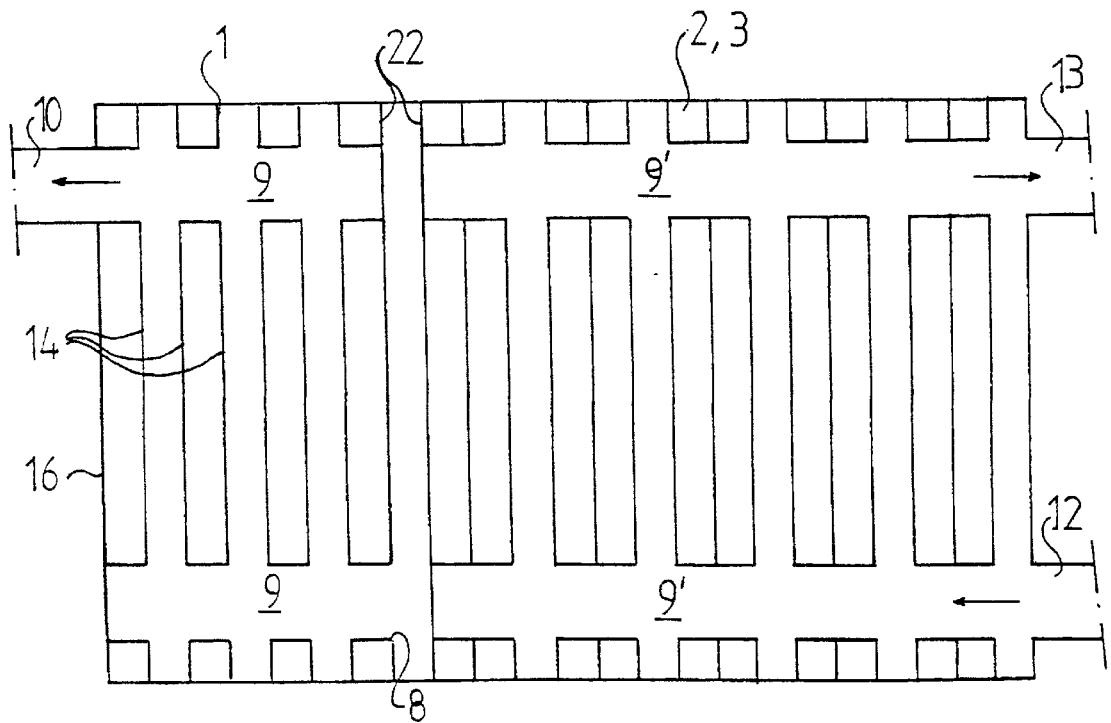
FIG. 10 discloses schematically a section corresponding to the one in FIG. 4 of the forth embodiment.

The fourth embodiment which is disclosed in FIGS. 9 and 10 includes a plate element 22, which for instance may be formed by two plates 14 between the precooler 1 and the combined evaporator and separation part 2, 3 according to the third embodiment. The distance between the two plates 14 of the plate element 22 is greater than between adjacent plates 14 of the precooler 1, the evaporator 2 and the separation part 3. The plate element 22 may also be comprised by a plurality of plates of the device and include an inlet which is formed by the outlet 6 of the combined evaporator and separation part 2, 3, wherein the air is conveyed into the plate element 22 and out through an outlet forming the inlet 8 of the precooler 1. Thus, the plate element 22 forms a connection conduit between the separation part 3 and the second channel 9 of the precooler 1 and hence replaces the conduit 7 disclosed in FIG. 1 and reduces the need of external piping.

As is disclosed in FIGS. 3, 5, 7 and 9, one or several of the plate interspaces forming the second channel 5 in the separation part 3 may include surface enlarging means 23. Such means may for instance include steel wool, corrugated nets or the like. Furthermore, steel wool or similar surface enlarging means may be provided in the port hole channel of the separation part 3 as an alternative or supplement to the surface enlarging means in the plate interspaces. It is also possible to obtain surface enlarging by providing the plates 14 which on both sides are passed by the air with a larger pressing depth than the remaining plates 14.

As appears from FIGS. 6, 7 and 9, the outlet member 11 may be formed by one of the four port holes of the plates 14 also in the second, third and forth embodiment.

The invention is not limited to the embodiment disclosed but may be varied and modified within the scoop of the following claims.

It is to be noted that the device may include a heat exchanger part in the form of one single cooler, i.e. a heat exchanger part which is not divided in a precooler and an evaporator.

What is claimed is:

1. A device for treating a substantially gaseous medium comprising a plurality of parallel plates (14) connected to each other and adjacent to each other such that the plates, by having port holes therein, form a first channel (5), the first channel being arranged to transport the gaseous medium, and at least a second channel (9, 9'), the second channel being separated from but in heat transferring contact with the first channel (5) and being arranged to transport a cooling medium for cooling the gaseous medium, wherein at least a part (3) of the first channel (5) forms a separation part and is arranged to separate liquid from the gaseous medium, said separation part (3) of the first channel (5) being formed by a plurality of plate interspaces between a part of said plates (14), wherein at least one of the plates (14), delimiting one of said plate interspaces, is arranged to be passed by the gaseous medium on both sides thereof.

2. A device according to claim 1, wherein the plates (14) form a common plate package.

3. A device according to claim 1, wherein the plates (14), at least seen in a section extending substantially in parallel with the plates, have substantially equal external dimensions.

4. A device according to claim 1, wherein said separation part (3) includes an outlet member (11) for the discharge of the separated liquid.

5. A device according to claim 4, wherein the plates (14) extend substantially in parallel with a vertical plane, and the outlet member (11) is in a lower part of said separation part (3).

6. A device according to claim 1, wherein the plates (14) are connected to each other by brazing.

7. A device according to claim 1, wherein the second channel includes a first channel portion (9), which forms a precooler (1) for transporting a first cooling medium, and a second channel portion (9'), which forms an evaporator (2) for transporting a second cooling medium.

8. A device according to claim 7, wherein the evaporator (2) is provided between the precooler (1) and said separation part (3).

9. A device according to claim 8, further comprising closed channels (12, 13), which extend through said separation part (3) and are arranged to enable the transportation of the second cooling medium to and from the evaporator (2).

10. A device according to claim 7, wherein said separation part (3) is provided between the precooler (1) and the evaporator (2).

11. A device according to claim 7, wherein the first channel (5) extends to an outlet (6) of said separation part (3) and is connected via an external or internal conduit (7, 22)

to the second channel (9) of the precooler (1), wherein the conduit (7) is arranged to convey the gaseous medium from said outlet (6) to the second channel (9) of the precooler for heat exchange with the incoming gaseous medium.

12. A device according to claim 1, wherein at least a part of the second channel (9') is formed by two of said plates (14), which are positioned adjacent to each other in such a manner that said part of the second channel (9') extends therebetween, and wherein said separation part (3) of the first channel (5) extends on both sides of said part of the second channel (9').

13. A device according to claim 7, wherein at least a part of the second channel (9') is included by the second channel portion.

14. A device according to claim 1, wherein the plates (14) included by said separation part (3) are arranged such that each third plate interspace, which is formed between adjacent plates (14), forms a part of the second channel (9') whereas the remaining plate interspaces, which are formed between adjacent plates (14), form a part of the first channel (5).

15. A device according to claim 1, wherein at least one of said plate interspaces forming said separation part (3) includes surface enlarging means (23).

16. A device according to claim 12, wherein said part of the second channel (9') is included by a second channel portion which forms an evaporator (2) for transporting a second cooling medium.

17. A plate package for treating a substantially gaseous medium comprising a plurality of parallel plates (14) connected to each other and adjacent to each other such that the plates, by having port holes therein, form a first channel (5), the first channel being arranged to transport the gaseous medium, and at least a second channel (9, 9'), the second channel being separated from but in heat transferring contact with the first channel (5) and being arranged to transport a cooling medium for cooling the gaseous medium, wherein at least a part (3) of the first channel (5) forms a separation part and is arranged to separate liquid from the gaseous medium, said separation part (3) of the first channel (5) being formed by a plurality of plate interspaces between a part of said plates (14), wherein at least one of the plates (14), delimiting one of said plate interspaces, is arranged to be passed by the gaseous medium on both sides thereof.

* * * * *